United States Patent
Moarefi et al.

(10) Patent No.: US 12,060,112 B2
(45) Date of Patent: Aug. 13, 2024

(54) MOUNTING SYSTEM FOR CONNECTING AN UPPER BODY STRUCTURE OF A MOTOR VEHICLE TO A VEHICLE PLATFORM OF THE MOTOR VEHICLE

(71) Applicants: HYUNDAI MOTOR COMPANY, Seoul (KR); Kia Corporation, Seoul (KR)

(72) Inventors: Bahman Moarefi, Mainz (DE); Do Hoi Kim, Sejong-si (KR); Ralf Matheis, Aachen (DE); Sven FAßbender, Aachen (DE)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 237 days.

(21) Appl. No.: 17/865,302

(22) Filed: Jul. 14, 2022

(65) Prior Publication Data

US 2023/0257027 A1  Aug. 17, 2023

(30) Foreign Application Priority Data

Feb. 11, 2022  (DE) .......................... 102022201424.3

(51) Int. Cl.
*B62D 27/02* (2006.01)
*B62D 25/02* (2006.01)
(Continued)

(52) U.S. Cl.
CPC ....... *B62D 25/2036* (2013.01); *B62D 25/025* (2013.01); *B62D 25/04* (2013.01); *B62D 27/023* (2013.01); *B62D 27/026* (2013.01)

(58) Field of Classification Search
CPC .. B62D 25/025; B62D 25/2036; B62D 25/04; B62D 27/023; B62D 27/026; B62D 27/02; B62D 27/065; B62D 27/06
(Continued)

(56) References Cited

U.S. PATENT DOCUMENTS 5,716,155 A  2/1998  Yoshida et al.

FOREIGN PATENT DOCUMENTS

| CN | 102277904 A | * | 12/2011 | ............... E04B 1/24 |
| CN | 102852230 A | * | 1/2013 | ............... E04B 1/24 |

OTHER PUBLICATIONS

Text CN102852230 (Year: 2013).*
Text CN 102277904 (Year: 2011).*

* cited by examiner

*Primary Examiner* — Dennis H Pedder
(74) *Attorney, Agent, or Firm* — MORGAN, LEWIS & BOCKIUS LLP

(57) ABSTRACT

A mounting system for connecting an upper body structure of a motor vehicle to a vehicle platform of the motor vehicle includes a hollow pillar element arranged lengthwise along a vertical vehicle axis; a fastening bracket laterally embracing a lower end portion of the hollow pillar element and including fastening interfaces for affixing the fastening bracket to the hollow pillar element at the lower end; a hollow clip-on connector arranged laterally along a longitudinal vehicle axis, the hollow clip-on connector defining a mounting platform including a horizontal resting surface for the hollow pillar element to be arranged thereupon at its lower end portion together with the fastening bracket and a vertical mating surface for abutting a corresponding mating surface of the fastening bracket; and a hollow side sill element arranged lengthwise along the longitudinal vehicle axis.

15 Claims, 3 Drawing Sheets

(51) Int. Cl.
*B62D 25/04* (2006.01)
*B62D 25/20* (2006.01)

(58) Field of Classification Search
USPC .............................. 296/193.06, 209, 29, 30
See application file for complete search history.

Fig. 5
Fig. 6
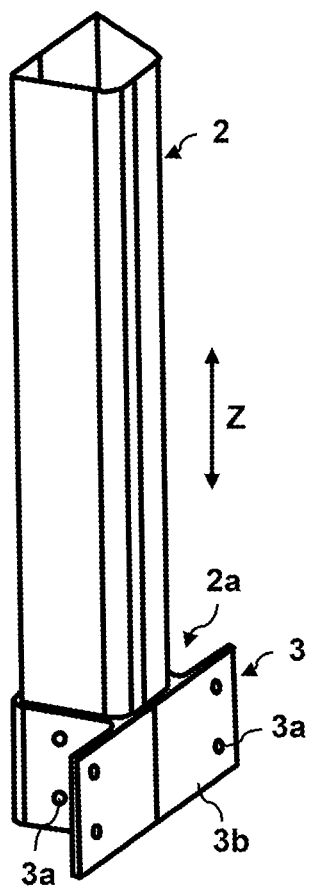
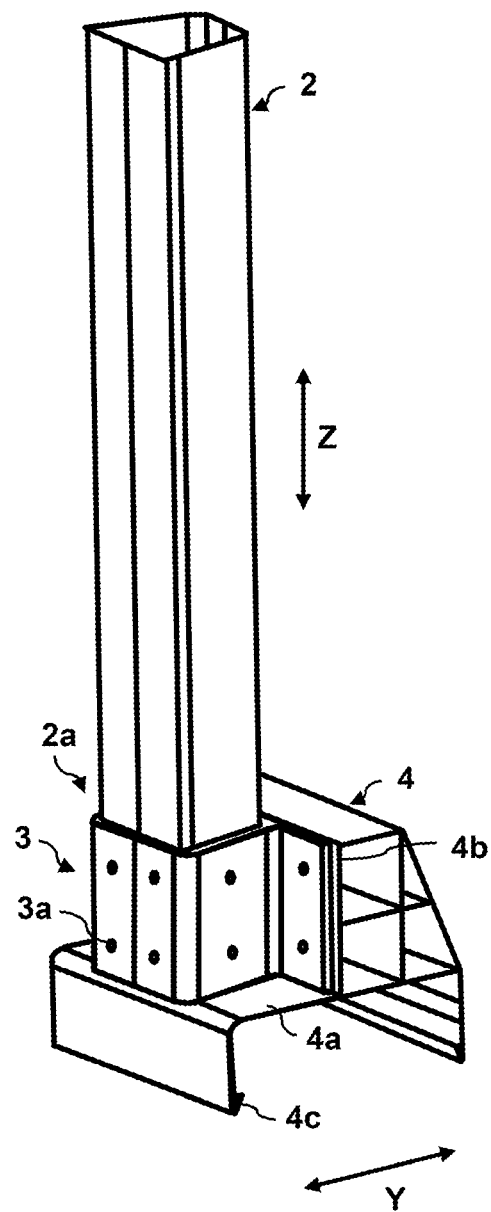

Fig. 7
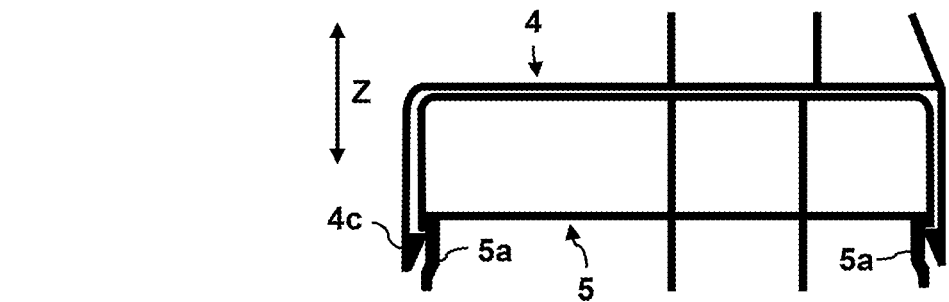
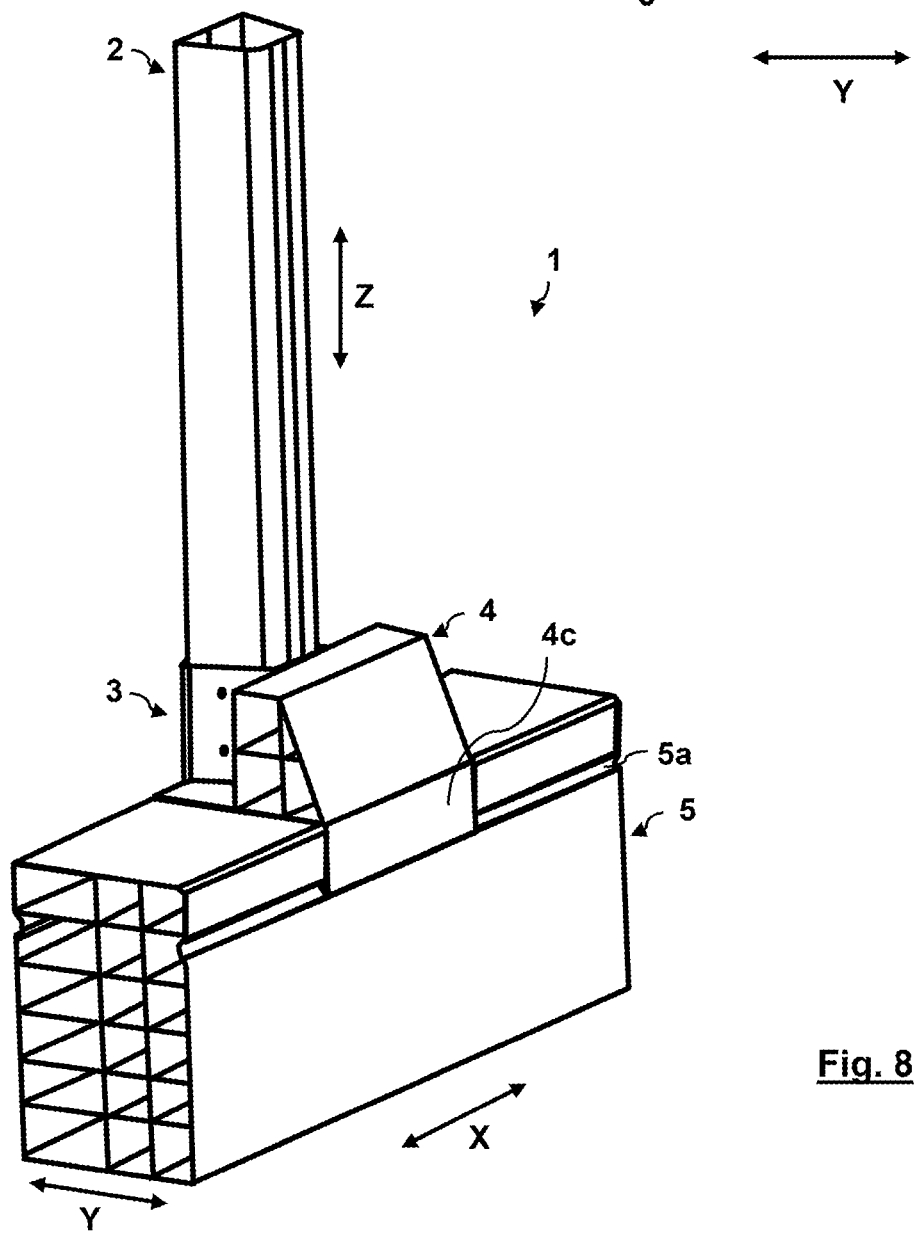
Fig. 8

MOUNTING SYSTEM FOR CONNECTING AN UPPER BODY STRUCTURE OF A MOTOR VEHICLE TO A VEHICLE PLATFORM OF THE MOTOR VEHICLE

CROSS-REFERENCE TO RELATED APPLICATION

The present application claims priority to German Patent Application No. 102022201424.3 filed on Feb. 11, 2022, the entire contents of which is incorporated herein for all purposes by this reference.

BACKGROUND OF THE PRESENT DISCLOSURE

Field of the Present Disclosure

The present disclosure pertains to a mounting system for connecting an upper body structure of a motor vehicle to a vehicle platform of the motor vehicle. The present disclosure further pertains to a motor vehicle, in particular a purpose-built vehicle, having an upper body structure mounted to a vehicle platform with such a mounting system.

Description of Related Art

Recently, some manufacturers of vehicles and automotive portions have put their focus on developing standardized and scalable electric vehicle (EV) platforms to underpin future vehicles in line with a completely new vehicle architecture to save development time and costs and thus get new electric cars on the road faster. To the present end, modular electric-rolling and ready-to-drive platforms, a.k.a. "skateboards", are specifically designed to be mated with bodies of varies types and shapes. In the present approach, the vehicle platform represents the part common to all vehicles and may combine chassis, powertrain apparatus, energy storage, crash management and the like. The upper body structure or "top hat" on the other hand comes in several variants specifically designed for different purposes according to the specific need of the customer.

Such purpose-built vehicles (PBV) may be designed for specific applications, like last-mile delivery or autonomous shuttles. They are designed from the start with specific applications in mind, and because of the standardization efforts up front, they can be produced at scale at a much lower price point than could otherwise be achieved. Purpose-built EV platforms may not only be lower in material cost but may also allow better performance in range, acceleration and internal space. Moreover, designing the vehicle architecture entirely around an EV concept, without combustion-engine legacy elements, means fewer compromises and more flexibility on average.

The connection between the top hat and the vehicle platform may be as flexible and simple as possible to keep manufacturing costs low. Future smart factories will have a production environment in which manufacturing plants and logistics systems largely organize themselves without human intervention to produce the desired products. As a prerequisite to such automated manufacturing approaches, the mounting system may have as few mechanical joints as possible and may not require welding.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

In light of the above, there is a need to find simple, cost-efficient and simple solutions for connecting structural body parts of purpose-built vehicles with each other.

Various aspects of the present disclosure are directed to providing mounting system and a vehicle.

According to one aspect of the present disclosure, a mounting system for connecting an upper body structure of a vehicle to a vehicle platform of the vehicle includes a hollow pillar element configured to be arranged lengthwise along a vertical vehicle axis; a fastening bracket configured to laterally embrace a lower end of the hollow pillar element and including fastening interfaces for affixing the fastening bracket to the hollow pillar element at the lower end; a hollow clip-on connector configured to be arranged laterally along a longitudinal vehicle axis, the hollow clip-on connector defining a mounting platform including a horizontal resting surface for the hollow pillar element to be arranged thereupon at its lower end portion together with the fastening bracket and a vertical mating surface for abutting a corresponding mating surface of the fastening bracket, wherein the fastening bracket has fastening interfaces for affixing the fastening bracket to the hollow clip-on connector at a mating surface thereof; and a hollow side sill element configured to be arranged lengthwise along the longitudinal vehicle axis, wherein the side sill element is formed with mounting notches running lengthwise along the side sill element and being configured to receive complementarily shaped clip arms formed at a lower side of the hollow clip-on connector for mounting the hollow clip-on connector on top of the side sill element.

According to another aspect of the present disclosure, a vehicle, a purpose-built vehicle, has an upper body structure mounted to a vehicle platform with a mounting system according to the present disclosure.

The present disclosure is directed to providing a connection between a pillar element and a side sill which is as simple and lightweight as possible yet still flexible and effective and at the same time suitable for automated production. To achieve this, the present disclosure connects the pillar with the side sill by an interlocking clip-on and/or snap-on connector that can simply be placed on the side sill anywhere along its longitudinal extension and fixed there once a desired position has been found by snapping the clip arms into the mounting notches. The hollow clip-on connector is formed with a suitable mounting platform which automatically ensures alignment of the pillar relative to the clip-on connector. The pillar only needs to be placed on the resting surface of the hollow clip-on connector together with the fastening bracket so that it abuts the vertical mating surface of the clip-on connector. Then both components may be fixed to each other via the fastening interfaces of the fastening bracket.

It is understood that the term "vehicle" or "vehicular" or other similar term as used herein is inclusive of vehicles in general such as passenger vehicles including sports utility vehicles (SUV), buses, trucks, various commercial vehicles, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Advantageous embodiments and improvements of the present disclosure are found in the subordinate claims.

According to an exemplary embodiment of the present disclosure, the hollow pillar element may be formed via extrusion along a longitudinal extension thereof.

The present disclosure may thus rely on cost efficient extrusion technology to form a hollow elongated pillar element by pushing the material through a die using a stamp or similar, e.g., a metal material like aluminum or the like.

According to an exemplary embodiment of the present disclosure, the fastening bracket may be formed via extrusion. The fastening bracket may include two separate bracket arms, each bracket arm configured to embrace one respective lateral half of the hollow pillar element at the lower end portion thereof.

By splitting up the bracket into two separate arm or shell portions, the installation process may be kept as simple as possible. Both arms of the bracket only need to be brought together around the lower end portion of the hollow pillar element. Then the arms may be fastened to the hollow pillar element via the fastening interfaces and/or via using an adhesive.

According to an exemplary embodiment of the present disclosure, the fastening interfaces of the fastening bracket may include fastening holes for receiving fasteners.

For example, blind rivet nuts and studs offer versatile solutions for fastening resilient nut/bolt threads to thin-walled metal components as they are used in an exemplary embodiment of the present disclosure. To the present end, holes may be pre-drilled or punched in the fastening bracket and/or other components of the present system. Blind nuts provide a very effective solution when load-bearing threads are required in thin walled materials or profiles as in the present cast. They may be fitted "blind" (from one side only) with no re-machining/processing and without damage to pre-treated surfaces.

Especially in the fast automotive industry, where the used components may withstand high stress, the demands on fastening technology are high. In addition to one-sided accessibility, the removability of the fastener is also very important, e.g., with regard to recyclability. These complex conditions may be met by employing friction and/or flow drilling screws, which can fasten thin metal sheets and profiles made of steel and/or aluminum without the demand for a pilot hole and in excellent quality. Work steps such as pre-drilling or pre-punching are no longer necessary. These screws penetrate the layers, extrude a short boss, form their own threads and apply clamping force between the layers. Due to the increased thread engagement in the formed draught a high-strength screw joint is generated without the undesired metal chipping. The screw joint is configured to transfer high pull-out as well as shearing forces.

It is to be understood that other fastening means such as different kinds of rivets, bolts and/or screws, may be employed for the present purpose.

According to an exemplary embodiment of the present disclosure, the hollow clip-on connector may be formed via extrusion along a lateral extension thereof.

By extrusion a hollow monolithic element may be formed that features not only integrated fastening means (like the clip-arms in the instant case) but may additionally also include stiffening structures likes rips or the like that run along an extrusion direction of the component.

According to an exemplary embodiment of the present disclosure, the side sill element may be formed via extrusion along a longitudinal extension thereof.

As with the clip arms of the clip-on connector, also the mounting notches may be easily formed into the component in a single production step using extrusion.

According to an exemplary embodiment of the present disclosure, the hollow pillar element, the fastening bracket, the hollow clip-on connector and/or the side sill element may include aluminum.

In recent years, the automotive industry has made a major push to reduce vehicle weight. With tightened regulations and strong consumer demand for fuel economy, aluminum has become a material of choice for many applications. In many instances, it has come to replace high-strength steel in the body structure. The material is easy to process, has a low density resulting in low-weight components and is corrosion resistant. Furthermore, aluminum is very easy to recycle. The special properties of aluminum make it far easier to process than other metals. In combination with its high durability, it offers a very cost-effective solution for all kinds of profiles.

According to an exemplary embodiment of the present disclosure, the fastening bracket may be adhesively fixed to the hollow pillar element.

Thus, the fastening element may not only be fastened to the fastening bracket may means of mechanical fasteners. Additionally, or alternatively, the contacting surfaces may be covered by a suitable adhesive to form a lasting and robust connection between the components.

According to an exemplary embodiment of the present disclosure, the fastening bracket may be adhesively fixed to the hollow clip-on connector at a mating surface thereof.

For example, a cold-curing epoxy adhesive may be suitable for the present purpose with the smart automated production in mind. Vehicle manufacturers have been increasingly relying on adhesives as one primary form of joining, moving away from more conventional methods such as mechanical fasteners and welding. The present joining technique has proven to be very effective, resulting in stiff, lightweight structures that are cost affective. However, the adhesives used are often still one-component epoxy-based adhesives that require a high-temperature cure (e.g., roughly 200° C.) for them to reach their most favorable performance. With the introduction of cold-cure adhesives (cure below 100° C. or even 70° C. and less) eliminates the need for costly cure-ovens, resulting in a direct cost saving from energy consumption as well as a reduction in thermal distortion, which makes it an ideal mating technique for automatized manufacturing.

According to an exemplary embodiment of the present disclosure, the hollow clip-on connector may be riveted and/or screwed to the side sill element at the clip arms.

The interlocking snap joint connection between the clip-arms of the hollow clip-on connector and the mounting notches of the side sill may thus facilitate a pre-assembly of the components, while additional mechanical fasteners may be employed for permanent joining and/or temporary fixation during further manufacturing.

According to an exemplary embodiment of the present disclosure, the hollow clip-on connector may be adhesively fixed to the side sill element.

As with the other components, also in the instant case mechanical fastener may be complemented and/or substituted by adhesion bonds.

The present disclosure will be explained in greater detail with reference to exemplary embodiments depicted in the drawings as appended.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 5 shows the hollow pillar element of FIG. 2 with mounted fastening bracket of FIG. 3.

FIG. 6 shows the assembly of FIG. 5 mounted on the hollow clip-on connector of FIG. 4.

FIG. 7 is a cross-sectional view of the connection between the hollow clip-on connector of FIG. 4 and a side sill element used in the mounting system of FIG. 1.

FIG. 8 shows the assemblies of FIG. 6 and FIG. 7 in a single perspective view.

Figure 1:
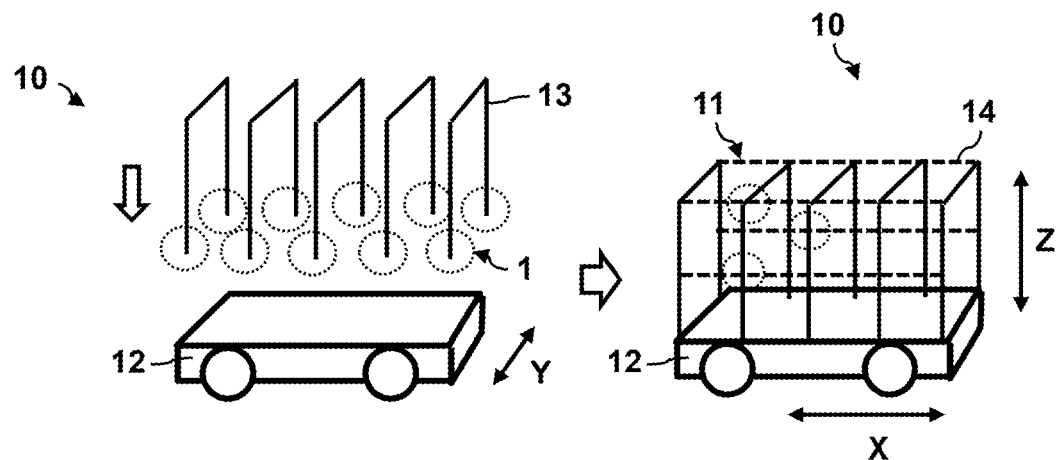
FIG. 1 schematically depicts a motor vehicle including a mounting system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

FIG. 1 schematically depicts a motor vehicle 10 including a mounting system 1 according to an exemplary embodiment of the present disclosure.

The motor vehicle 10 may be, for example, a purpose-built electric vehicle which is designed in a modular fashion based on two main parts, namely the vehicle platform 12 or skateboard and the upper body structure 11 or top hat. The vehicle platform 12 represents the common substructure of the EV including chassis, powertrain apparatus, electric batteries and the like. The upper body structure 11 on the other hand may come in different variants fulfilling various purposes according to the customer's needs (e.g., cargo transportation like last-mile delivery or similar, passenger transportation like autonomous shuttle services, buses, taxis and the like).

In the exemplary embodiment of FIG. 1, the vehicle platform 12 has a flat shape, while the upper body structure 11 follows a shape of a tube which is built-up based on pipe-like 3D-structures. As may be seen on the left in FIG. 1, arc-shaped and laterally oriented structure segments 13 are arranged one after the other along a longitudinal vehicle axis X. These are joint to each other by longitudinally running structure segments 14 as shown on the right of FIG. 1. Each lateral structure segments 13 is joined to the vehicle platform 12 on both lateral sides of the vehicle 10 by a mounting system 1 as it is explained below with reference to FIG. 2, FIG. 3, FIG. 4, FIG. 5, FIG. 6, FIG. 7, and FIG. 8.

It is to be understood that the shown shape and configuration is merely an example. Other shapes and configurations are of course possible. The depicted exemplary embodiment of the present disclosure may offer particular advantages with regards to automated manufacturing of different PBV hats.

Figure 2:
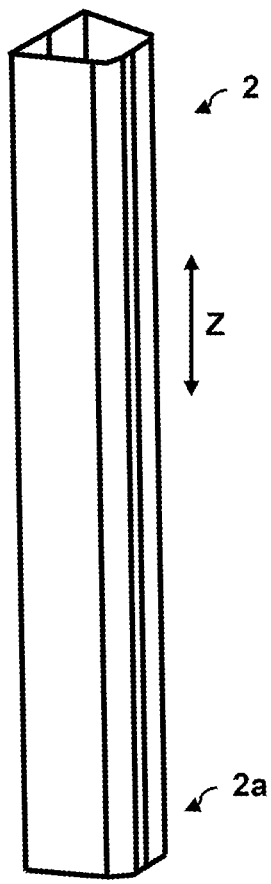
FIG. 2 is a perspective view of a pillar element used in the mounting system of FIG. 1.

The mounting system 1 includes a hollow pillar element 2 as shown in FIG. 2, which is formed via extrusion along its longitudinal extension and is configured to be arranged lengthwise along a vertical vehicle axis Z.

Figure 3:
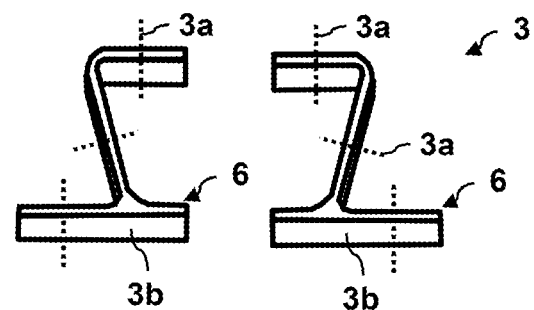
FIG. 3 is a perspective view of a fastening bracket used in the mounting system of FIG. 1.

The mounting system 1 further includes a fastening bracket 3 as shown in FIG. 3, which is configured to laterally embrace a lower end portion 2a of the pillar element 2. The fastening bracket 3 is a two part component including two separate bracket arms 6, each bracket arm 6 configured to embrace one respective lateral half of the pillar element 2 at the lower end portion 2a thereof. Both bracket arms 6 may also be formed via extrusion, e.g., together in a single production step.

The fastening bracket 3 has several fastening interfaces 3a for affixing the fastening bracket 3 to the pillar element 3 at the lower end portion 2a. In the shown exemplary embodiment of the present disclosure, each fastening interface 3a is configured as a pre-formed fastening hole for receiving mechanical fasteners, e.g., blind nut rivets or similar.

FIG. 5 shows the pillar element 2 after attachment of the fastening bracket 3 at its lower end portion 2a (also cf. FIG. 6). In the present exemplary case, the fastening bracket 3 is fixed to the pillar element 2 by eight mechanical fasteners.

The connection between the pillar element 2 and the fastening bracket 3 may be strengthened by covering the mating surfaces of one or both components with a suitable adhesive, e.g., a cold-curing epoxy adhesive, before bringing both components into contact with each other and before fixing the connection on basis of the mechanical fasteners.

Figure 4:
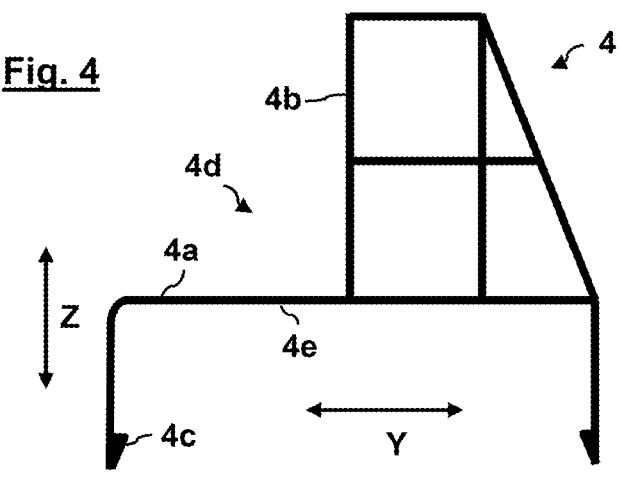
FIG. 4 is a cross-sectional view of a clip-on connector used in the mounting system of FIG. 1.

The mounting system 1 further includes a hollow clip-on connector 4 as shown in FIG. 4 in a cross-section view. The clip-on connector 4 is formed via extrusion along its lateral extension and is configured to be arranged laterally along the longitudinal vehicle axis X. The clip-on connector 4 defines a mounting platform 4d at an upper side, which has a horizontal resting surface 4a for the pillar element 2 to be arranged thereupon at its lower end portion 2a together with the fastening bracket 3 and a vertical mating surface 4b for abutting a corresponding mating surface 3b of the fastening bracket 3. The fastening bracket 3 has several fastening interfaces 3a for affixing the fastening bracket 3 to the clip-on connector 4 at its mating surface 3b, which are also configured as fastening holes in the present case. To the present end, the clip-on connector 4 may also be provided with pre-drilled and/or pre-punched fastening holes.

FIG. 6 shows the assembled setup of pillar element 2, fastening bracket 3 and clip-on connector 4. As may be seen here, the fastening bracket 3 is fixed to the clip-on connector 4 by four mechanical fasteners. Also in the instant case, the connection may be fortified by utilizing an adequate adhesive on some or all of the contacting surfaces.

Coming now to FIGS. 7 and 8, the mounting system 1 further includes a hollow side sill element 5, which is formed via extrusion along its longitudinal extension. The side sill element 5 is configured to be arranged lengthwise along the longitudinal vehicle axis X. It is formed with mounting notches 5a running lengthwise along the side sill element 5 that are configured to receive complementarily shaped clip arms 4c formed at a lower side 4e of the clip-on connector 4 for mounting the clip-on connector 4 on top of the side sill element 5.

As may be understood from FIG. 8, the extrusion profiles used in the present system 1 may be provided with stiffening structures, e.g., rips, for optimal strength-to-weight ratio. In the shown embodiment, the side sill element 5 and the clip-on connector 4 both are provided with rips on the inside running along the longitudinal vehicle axis X.

Hence, the clip-on connector 4 merely needs to be placed upon the side sill element 5 and pushed downwards to snap the clip arms 4c into the mounting notches 5a. After the present pre-assembly, the clip-on connector 4 may still be moved along the longitudinal axis X by sliding and/or shifting both components relative to each other along the mounting notches 5a. Once a suitable mounting position is reached, the clip-on connector 4 may be permanently fixed to the side sill element 5 on basis of mechanical fasteners, e.g., flow drill screws.

Also in the instant case, an adhesive may be used on the lower side 4e of the clip-on connector 4 for further strengthening the connection to the side sill element 5. In the instant case, the adhesive needs to be applied before the connector 4 is snapped into place upon the side sill element 5. However, it may be cured after the connector 4 is fixed to the side sill element 5 by the mechanical fasteners. In fact, the mechanical fasteners may only secure the precise position of the connector 4 during curing of the adhesive and may be removed afterwards. In the instant case, the adhesive may provide the permanent fixation of both components to each other.

The presently described mounting system 1 is highly performant and yet cost-effective and also compatible with automated manufacturing in a Smart Factory environment (no paintshop and weldshop). The system 1 offers a simple assembly based on few portions and using an interlocking snap joint solution for pre-assembly and cold cure adhesive for permanent joining.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A mounting system for connecting an upper body structure of a vehicle to a vehicle platform of the vehicle, the mounting system comprising:
    a hollow pillar element configured to be arranged lengthwise along a vertical vehicle axis;
    a fastening bracket configured to laterally embrace a lower end portion of the hollow pillar element and including fastening interfaces for affixing the fastening bracket to the hollow pillar element at the lower end portion;
    a hollow clip-on connector configured to be arranged laterally along a longitudinal vehicle axis, wherein the hollow clip-on connector defining a mounting platform including:
        a horizontal resting surface for the hollow pillar element to be arranged thereupon at a lower end portion thereof together with the fastening bracket; and
        a vertical mating surface for abutting a corresponding mating surface of the fastening bracket,
        wherein the fastening bracket has fastening interfaces for affixing the fastening bracket to the hollow clip-on connector at a mating surface thereof; and
    a hollow side sill element configured to be arranged lengthwise along the longitudinal vehicle axis,
    wherein the hollow side sill element is formed with mounting notches running lengthwise along the hollow side sill element to receive complementarily shaped clip arms formed at a lower side of the hollow clip-on connector for mounting the hollow clip-on connector on top of the hollow side sill element.

2. The mounting system of claim 1, wherein the hollow pillar element is formed via extrusion along a longitudinal extension thereof.

3. The mounting system of claim 2, wherein the fastening bracket is formed via extrusion and includes two separate bracket arms, each bracket arm configured to embrace one respective lateral half of the hollow pillar element at the lower end portion thereof.

4. The mounting system of claim 1, wherein the fastening bracket is formed via extrusion and includes two separate bracket arms, each bracket arm configured to embrace one respective lateral half of the hollow pillar element at the lower end portion thereof.

5. The mounting system of the claim 1, wherein the fastening interfaces of the fastening bracket include fastening holes for receiving fasteners.

6. The mounting system of claim 1, wherein the hollow clip-on connector is formed via extrusion along a lateral extension thereof.

7. The mounting system of the claim 1, wherein the hollow side sill element is formed via extrusion along a longitudinal extension thereof.

8. The mounting system of the claim 1, wherein at least one of the hollow pillar element, the fastening bracket, the hollow clip-on connector and the hollow side sill element is made of aluminum.

9. The mounting system of the claim 1, wherein a cross section of the hollow pillar element is in a shape of a trapezoid.

10. A vehicle including the upper body structure mounted to the vehicle platform with the mounting system of the claim 1.

11. The vehicle of claim 10, wherein the fastening bracket is adhesively fixed to the hollow pillar element.

12. The vehicle of claim 11, wherein the fastening bracket is adhesively fixed to the hollow clip-on connector at the mating surface thereof.

13. The vehicle of claim 10, wherein the fastening bracket is adhesively fixed to the hollow clip-on connector at the mating surface thereof.

14. The vehicle of claim 10, wherein the hollow clip-on connector is riveted or screwed to the hollow side sill element at the clip arms.

15. The vehicle of claim 10, wherein the hollow clip-on connector is adhesively fixed to the hollow side sill element.

* * * * *